(12) United States Patent
Prieto et al.

(10) Patent No.: US 10,442,510 B2
(45) Date of Patent: Oct. 15, 2019

(54) STABILIZING SYSTEM FOR FLOATING WIND TURBINES

(71) Applicants: Carlos Prieto, Sunnyvale, CA (US); Laura Nunez, Sunnyvale, CA (US); Meir Messingher Lang, Mountain View, CA (US); Daniel Curiel, Tomball, TX (US)

(72) Inventors: Carlos Prieto, Sunnyvale, CA (US); Laura Nunez, Sunnyvale, CA (US); Meir Messingher Lang, Mountain View, CA (US); Daniel Curiel, Tomball, TX (US)

(73) Assignee: Upy Designs LLC., Tomball, TX (US)

( * ) Notice: Subject to any disclaimer, the term of this patent is extended or adjusted under 35 U.S.C. 154(b) by 0 days.

(21) Appl. No.: 16/176,981

(22) Filed: Oct. 31, 2018

(65) Prior Publication Data
US 2019/0127032 A1 May 2, 2019

Related U.S. Application Data

(60) Provisional application No. 62/579,242, filed on Oct. 31, 2017.

(51) Int. Cl.
*B63B 39/03* (2006.01)
*B63B 35/44* (2006.01)
*F03D 13/25* (2016.01)

(52) U.S. Cl.
CPC .............. *B63B 39/03* (2013.01); *B63B 35/44* (2013.01); *F03D 13/25* (2016.05); *B63B 2035/446* (2013.01); *F05B 2240/93* (2013.01); *F05B 2240/95* (2013.01); *F05B 2260/964* (2013.01); *F05B 2270/18* (2013.01)

(58) Field of Classification Search
CPC ......... B63B 39/03; B63B 35/44; F03D 13/25; F05B 2240/93; F05B 2240/95; F05B 2260/964
See application file for complete search history.

(56) References Cited

U.S. PATENT DOCUMENTS

| | | | |
|---|---|---|---|
| 2010/0158697 A1* | 6/2010 | Kim | F03D 3/005 416/243 |
| 2011/0037264 A1* | 2/2011 | Roddier | B63B 35/44 290/44 |
| 2011/0135398 A1* | 6/2011 | Lopez | F03D 13/10 405/195.1 |

(Continued)

FOREIGN PATENT DOCUMENTS

JP 5688964 B2 3/2015

*Primary Examiner* — S. Joseph Morano
*Assistant Examiner* — Jovon E Hayes
(74) *Attorney, Agent, or Firm* — Plager Schack LLP; Mark H. Plager; Michael J. O'Brien

(57) ABSTRACT

A floating wind turbine assembly, configured to self-stabilize in water without a fixed anchor. The floating wind turbine assembly has a wind turbine, joined to a turbine shaft. A beam anchor is joined to the turbine shaft. A hollow moving mass, arranged around the beam anchor, such that the hollow moving mass can be moved up or down the beam anchor. The hollow moving mass includes a pump, having a pump first end connected to the water with a first pump hose and a pump second end arranged within the hollow moving mass with a second pump hose.

6 Claims, 4 Drawing Sheets

(56) References Cited

U.S. PATENT DOCUMENTS

2015/0275850 A1* 10/2015 Numajiri ............... E02D 27/425
                                                              290/55
2016/0230746 A1*  8/2016 Dagher .................. F03D 13/25
2019/0127032 A1*  5/2019 Prieto ..................... B63B 39/03

* cited by examiner

STABILIZING SYSTEM FOR FLOATING WIND TURBINES

RELATED APPLICATION

This application claims priority to provisional patent application U.S. Ser. No. 62/579,242 filed on Oct. 31, 2018, the entire contents of which is herein incorporated by reference.

BACKGROUND

The embodiments herein relate generally to a system for stabilizing floating wind turbines assembly configured to stabilize the unit using a smart tuned mass damper/tuned vibration absorber to a spar-buoy without the use of a fixed anchor. Prior to embodiments of the disclosed invention floating off shore wind turbines were subject to vibrations from water waves and even wind loads due to the lack of a fixed anchor, which puts the wind turbine at risk. Embodiments of the disclosed invention solve this problem by stabilization of spar-buoy systems that can go to unlimited water depths at lower costs.

SUMMARY

A floating wind turbine assembly is configured to self-stabilize in water without a fixed anchor. The floating wind turbine assembly comprises a wind turbine, joined to a turbine shaft. A beam anchor is joined to the turbine shaft. A hollow moving mass is arranged around a beam shaft joined to the beam anchor, such that the hollow moving mass can be moved up or down the beam shaft. The hollow moving mass further comprises a pump, having a pump first end connected to the water with a first pump hose and a pump second end arranged within the hollow moving mass with a second pump hose. A first plurality of sensors is arranged proximate the turbine shaft. A second plurality of sensors is arranged on the turbine shaft.

A controller is communicatively coupled to the first plurality of sensors, the second plurality of sensors, the hollow moving mass, and the pump. The controller is programmed with instructions to perform the following instructions in a loop until a natural frequency equals an excitation frequency. First, receive a movement data from the plurality of sensors. Then, determine the excitation frequency from the movement data. Next, receive a natural frequency data from the second plurality of sensors. After that, determine the natural frequency of the wind turbine from the natural frequency data. Following that, adjust the hollow moving mass. When the natural frequency equals the excitation frequency inertial forces in a sea state of the water and the wind turbine equalize in order to stabilize the wind turbine.

In some embodiments, adjusting the hollow moving mass includes raising the hollow moving mass along the beam shaft toward the beam anchor. Adjusting the hollow moving mass could also include lowering the hollow moving mass along the beam shaft away from the beam anchor. Adjusting the hollow moving mass can include transferring the water into the hollow moving mass. Adjusting the hollow moving mass can include transferring the water from the hollow moving mass.

In some embodiments, the floating wind turbine assembly further comprises a second beam anchor, joined to the turbine shaft. A second hollow moving mass is arranged around a second beam shaft joined to the second beam anchor, such that the second hollow moving mass can be moved up or down the second beam shaft. The second hollow moving mass further comprises a second pump, having a second pump first end connected to the water with a second pump first hose and a second pump second end arranged within the second hollow moving mass with a second pump second hose.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
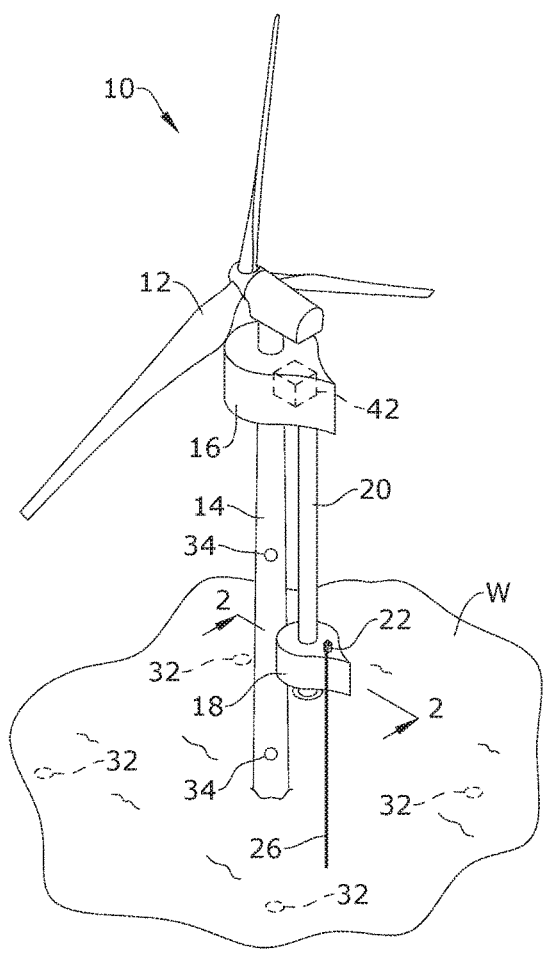
FIG. 1 is a schematic perspective view of the invention
Figure 2:
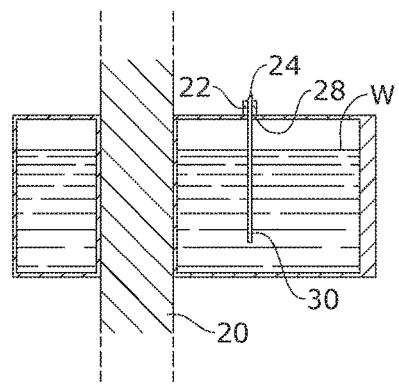
FIG. 2 is a schematic section view of the invention, taken along line 2-2 in FIG. 1
Figure 3:
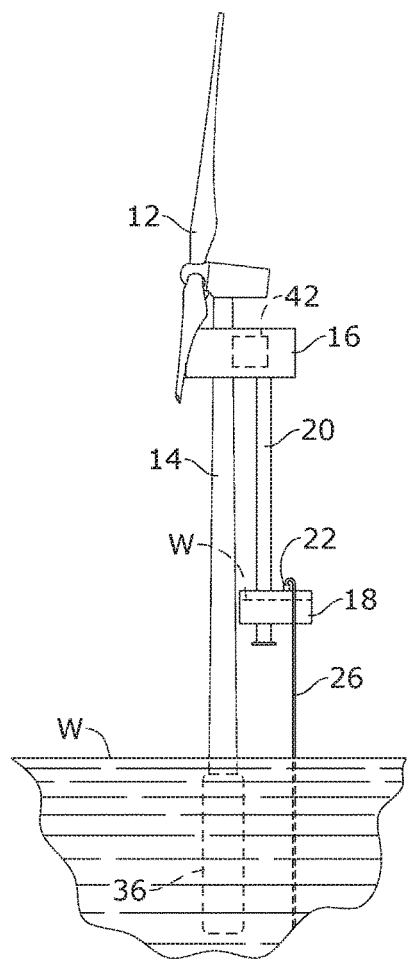
FIG. 3 is a schematic view of the invention
Figure 4:
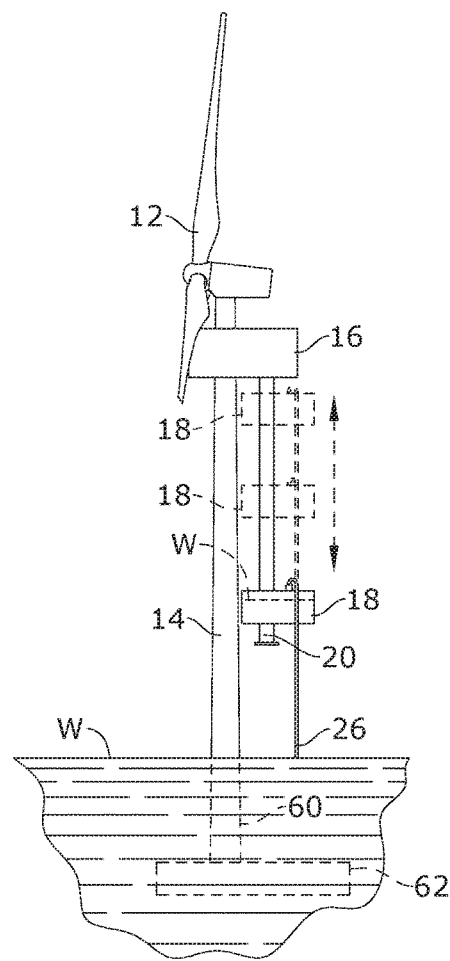
FIG. 4 is a schematic view of the invention, illustrating the movement of mass 12 on beam 10
Figure 5:
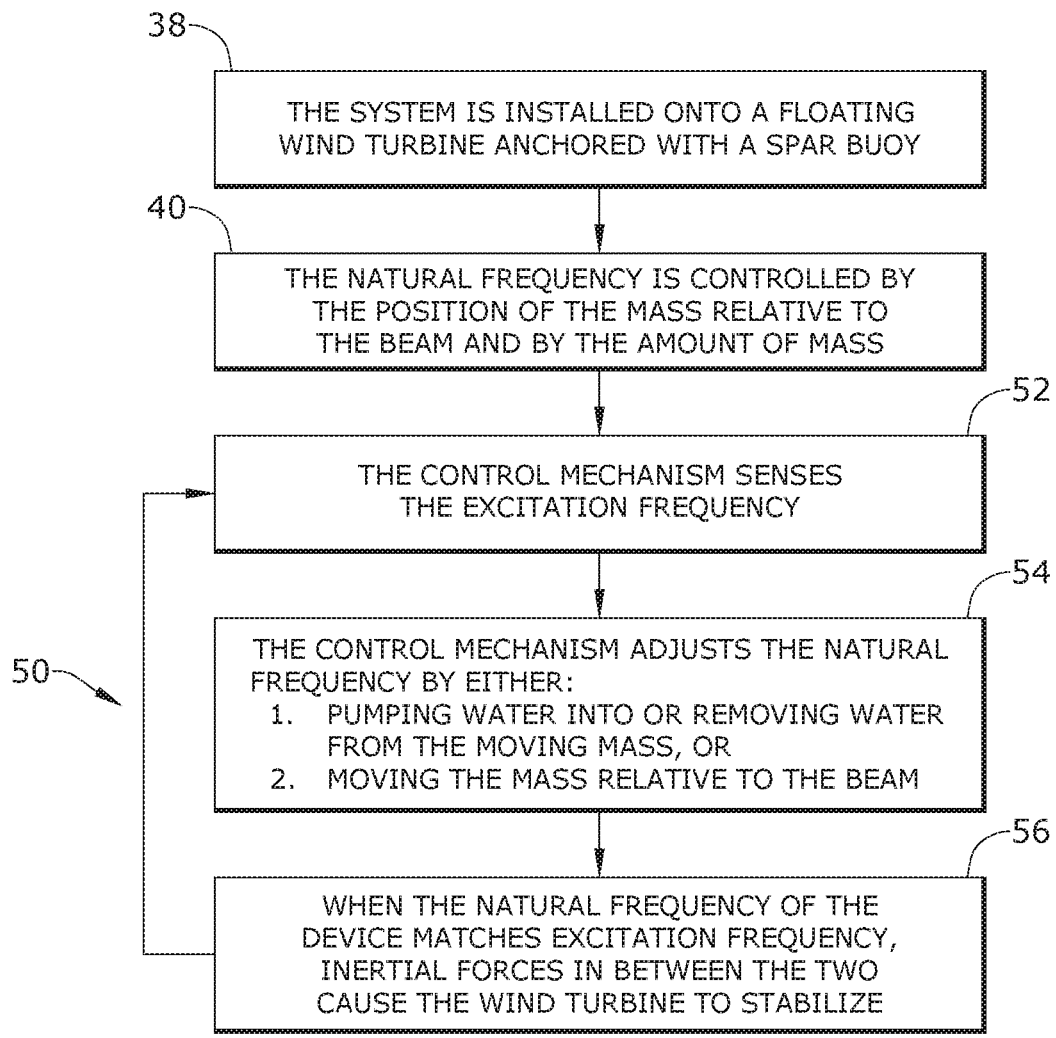
FIG. 5 is a flow chart of the invention
Figure 6:
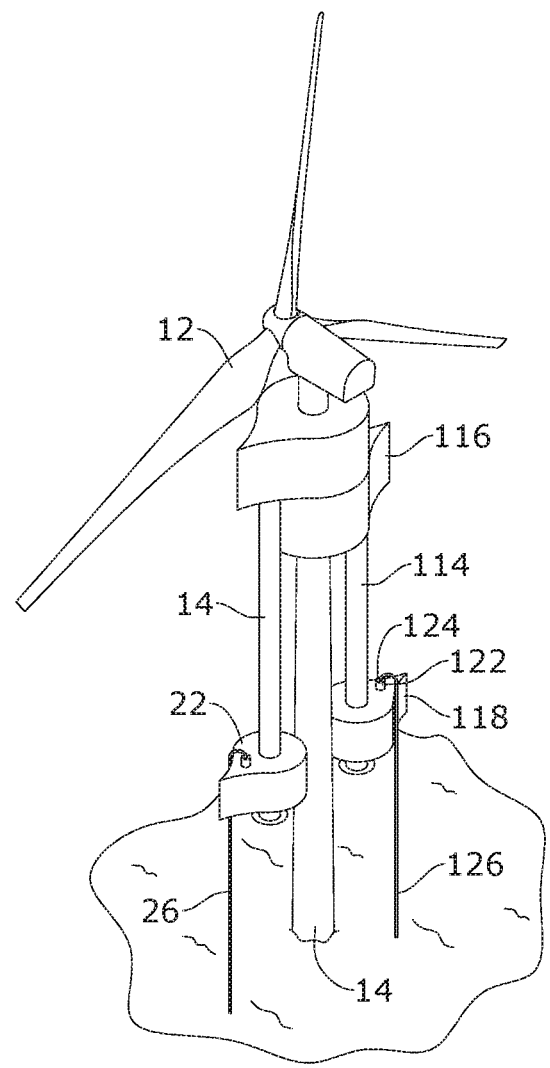
FIG. 6 is a schematic perspective view of an alternate embodiment of the invention with parallel systems installed

A floating wind turbine assembly 10 is configured to self-stabilize in water W without a fixed anchor. The floating wind turbine assembly 10 comprises a wind turbine 12, joined to a turbine shaft 14. A beam anchor 16 is joined to the turbine shaft 14. A hollow moving mass 18 is arranged around a beam shaft 20 joined to the beam anchor 16. The hollow moving mass 18 can be moved up or down the beam shaft 20. The hollow moving mass 18 further comprises a pump 22, having a pump first end 24 connected to the water W with a first pump hose 26 and a pump second end 28 arranged within the hollow moving mass 18 with a second pump hose 30. A first plurality of sensors 32 is arranged proximate the turbine shaft 14. A second plurality of sensors 34 is arranged on the turbine shaft 14.

The floating wind turbine assembly 10 can be installed onto a floating wind turbine with a spar buoy 36 at step 36. Once installed, the floating wind turbine assembly 10 has a natural frequency. The natural frequency can be adjusted at step 40 by raising or lowering the hollow moving mass 18 along the beam shaft toward the beam anchor 16. The natural frequency can be adjusted by pumping water into or out of the hollow moving mass 18 with the pump 22. The pump 22 is configured to be able to run either end as suction or discharge.

A controller 42 is communicatively coupled to the first plurality of sensors 32, the second plurality of sensors 34, the hollow moving mass 18, and the pump 22. The controller 42 is programmed with instructions to perform the following instructions in a loop 50 until a natural frequency equals an excitation frequency at step 52. First, at receive a movement data from the plurality of sensors. Then, determine the excitation frequency from the movement data. Next, receive a natural frequency data from the second plurality of sensors. After that, determine the natural frequency of the wind turbine from the natural frequency data. Following that, adjust the hollow moving mass at step 54. When the natural frequency equals the excitation frequency at step 56 inertial forces in a sea state of the water and the wind turbine equalize in order to stabilize the wind turbine.

In some embodiments, adjusting the hollow moving mass 18 includes raising the hollow moving mass 18 along the beam shaft 20 toward the beam anchor 16. Adjusting the hollow moving mass 18 could also include lowering the hollow moving mass 18 along the beam shaft 20 away from the beam anchor 16. Adjusting the hollow moving mass 18 can include transferring the water W into the hollow moving mass 18. Adjusting the hollow moving mass 18 can include transferring the water W from the hollow moving mass 18.

In some embodiments, a floating wind turbine assembly 110 further comprises a second beam anchor 116, joined to the turbine shaft 14. A second hollow moving mass 118 is arranged around a second beam shaft 120 that is joined to the second beam anchor 116, such that the second hollow moving mass 118 can be moved up or down the second beam shaft 120. The second hollow moving mass 118 further comprises a second pump 122, having a second pump first end 124 connected to the water W with a second pump first hose 126 and a second pump second end arranged within the second hollow moving mass 118 with a second pump second hose.

The controller 42 senses vibration frequency and adjust natural frequency by either pumping water into the moving mass or by moving the mass relative to the beam. In some embodiments, multiple units could be installed in parallel to control different types of oscillations.

In some embodiments, a spring system can help mitigate vertical oscillations. A spring 60, can be attached between an anchor 62 and the floating offshore wind turbine. The spring 60 has a natural frequency. This natural frequency is a function of length and mass of the spring. The spring system can use a control mechanism to change the equivalent length of the system, the mass, or both in order to match a natural frequency of an excitation frequency coming from a source such as ocean waves. The spring can be a single bar, a series of bars connected in parallel or in series with the mass or any combination of these.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶116. In particular, any use of "step of" in the claims is not intended to invoke the provision of 35 U.S.C. § 112, ¶116.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A floating wind turbine assembly, configured to self-stabilize in water without a fixed anchor, the floating wind turbine assembly comprising:
   a wind turbine, joined to a turbine shaft;
   a beam anchor, joined to the turbine shaft;
   a hollow moving mass, arranged around a beam shaft joined to the beam anchor, such that the hollow moving mass can be moved up or down the beam shaft; and further comprising: a pump, having a pump first end connected to the water with a first pump hose and a pump second end arranged within the hollow moving mass with a second pump hose;
   a first plurality of sensors, arranged proximate the turbine shaft;
   a second plurality of sensors, arranged on the turbine shaft;
   a controller, communicatively coupled to the first plurality of sensors, the second plurality of sensors, the hollow moving mass, and the pump; wherein the controller is programmed with instructions to perform the following instructions in a loop until a natural frequency equals an excitation frequency:
   receive a movement data from the plurality of sensors;
   determine the excitation frequency from the movement data;
   receive a natural frequency data from the second plurality of sensors;
   determine the natural frequency of the wind turbine from the natural frequency data
   adjust the hollow moving mass
   wherein when the natural frequency equals the excitation frequency inertial forces in a sea state of the water and the wind turbine equalize in order to stabilize the wind turbine.

2. The floating wind turbines assembly of claim 1 wherein adjusting the hollow moving mass includes raising the hollow moving mass along the beam shaft toward the beam anchor.

3. The floating wind turbines assembly of claim 1 wherein adjusting the hollow moving mass includes lowering the hollow moving mass along the beam shaft away from the beam anchor.

4. The floating wind turbines assembly of claim 1, wherein adjusting the hollow moving mass includes transferring the water into the hollow moving mass.

5. The floating wind turbines assembly of claim 1, wherein adjusting the hollow moving mass includes transferring the water from the hollow moving mass.

6. The floating wind turbines assembly of claim 1, further comprising:
- a second beam anchor, joined to the turbine shaft;
- a second hollow moving mass, arranged around a second beam shaft joined to the second beam anchor, such that the second hollow moving mass can be moved up or down the second beam shaft; and further comprising: a second pump, having a second pump first end connected to the water with a second pump first hose and a second pump second end arranged within the second hollow moving mass with a second pump second hose.

* * * * *